F. A. J. THAYER AND J. W. ALEXANDER.
RETORT.
APPLICATION FILED NOV. 24, 1919.
1,412,579.
Patented Apr. 11, 1922.
6 SHEETS—SHEET 1.
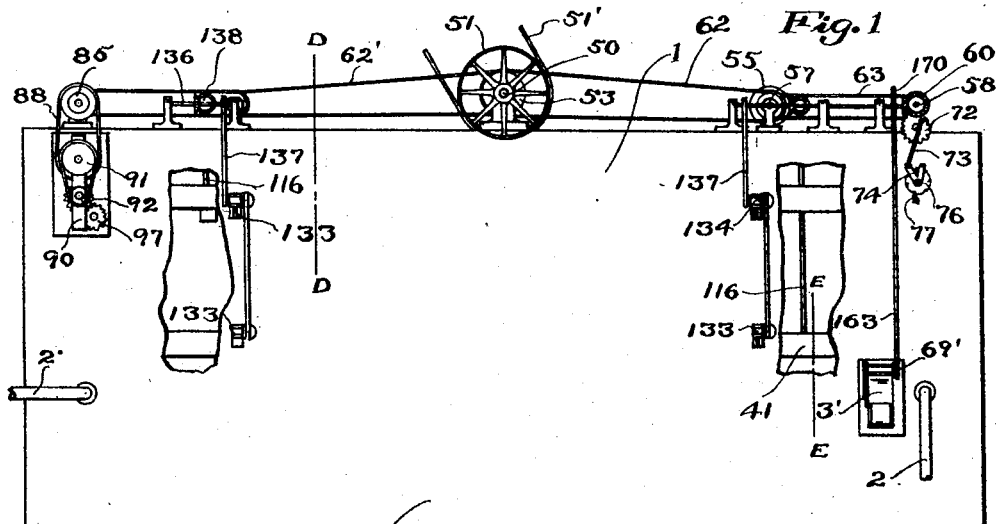
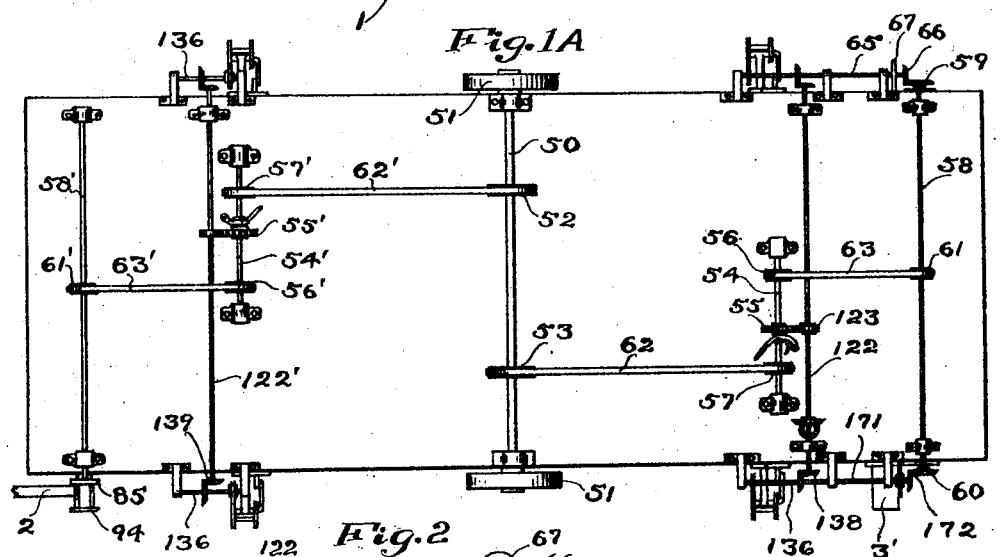
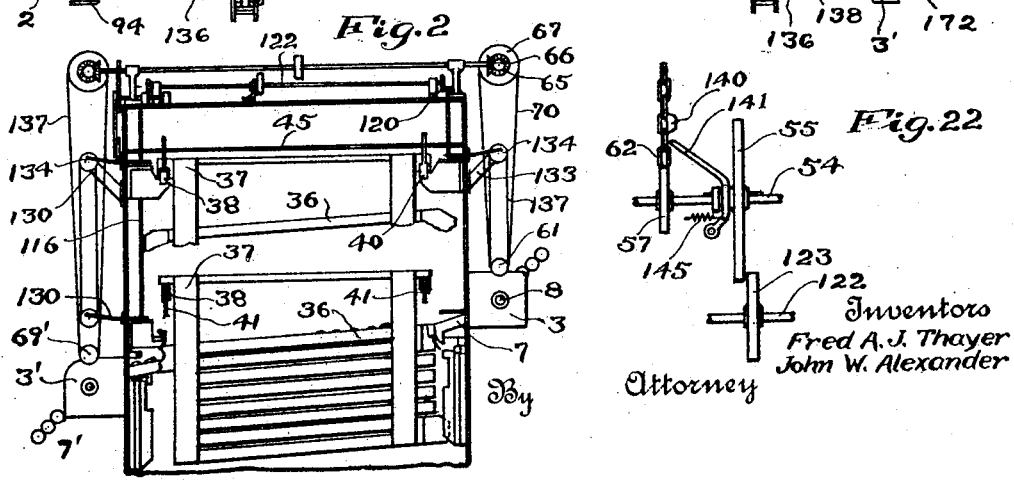
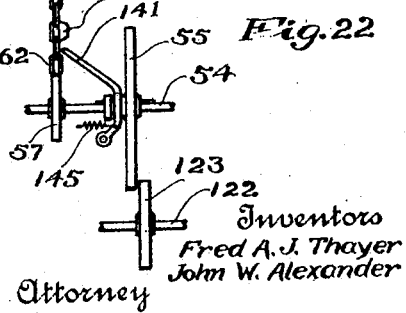
Inventors
Fred A. J. Thayer
John W. Alexander
By
Attorney

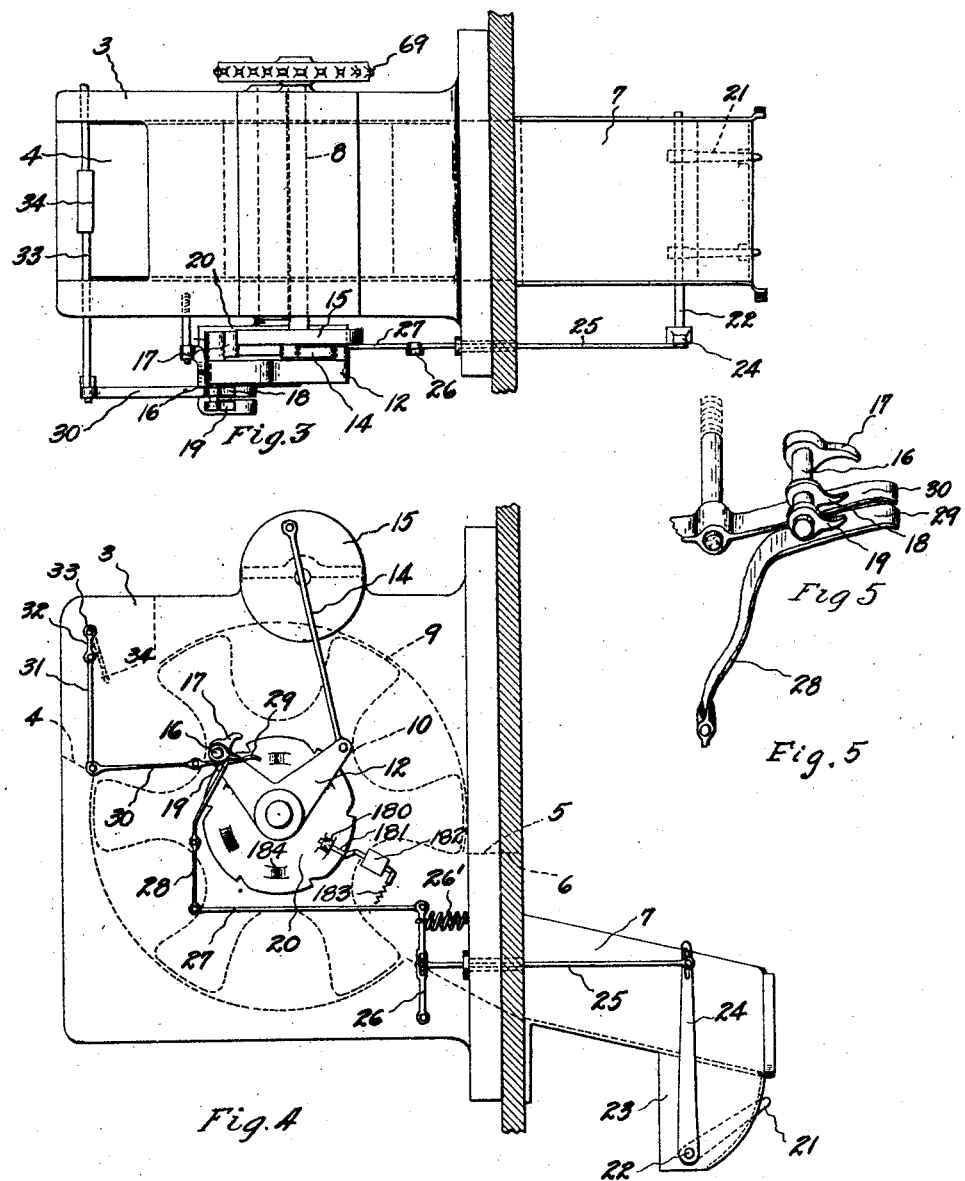

F. A. J. THAYER AND J. W. ALEXANDER.
RETORT.
APPLICATION FILED NOV. 24, 1919.
1,412,579.
Patented Apr. 11, 1922.
6 SHEETS—SHEET 3.
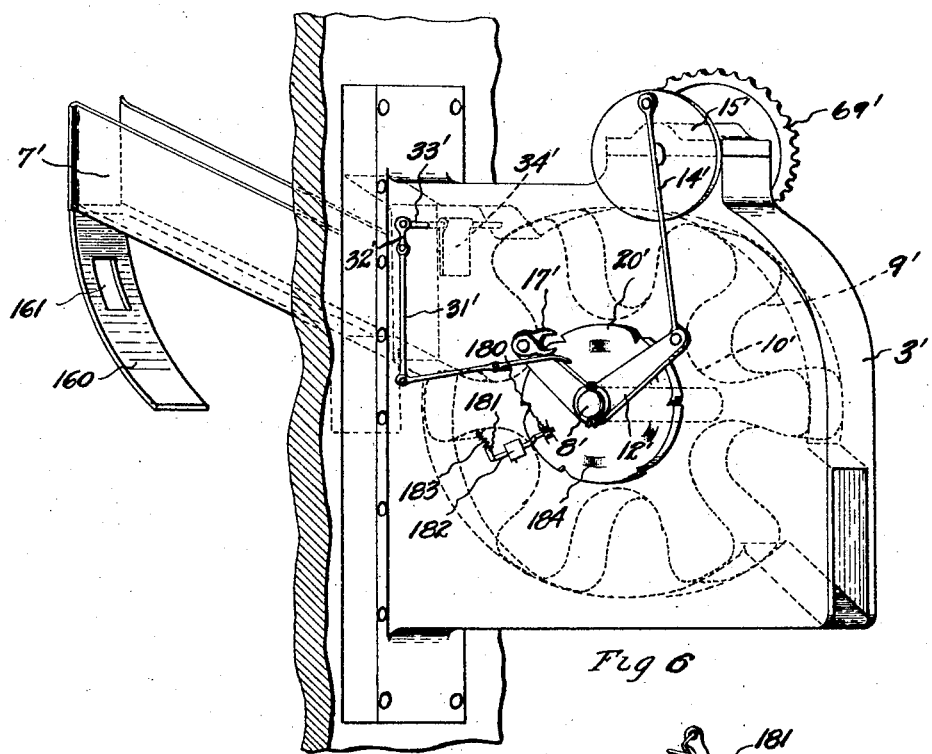
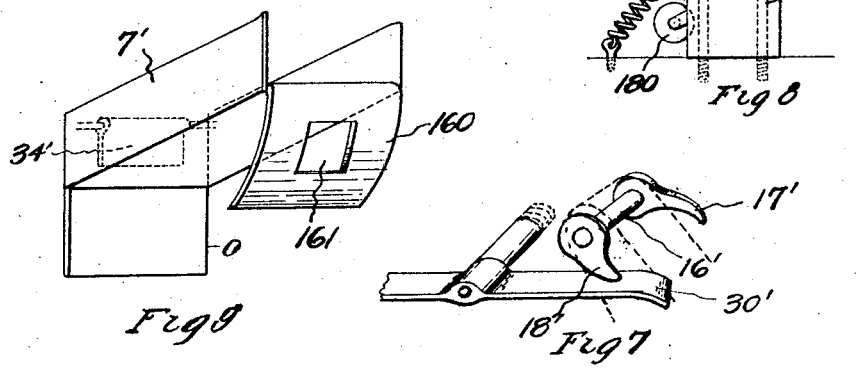
INVENTOR
Fred A. J. Thayer
John W. Alexander
BY
Richard J. Cook
ATTORNEY

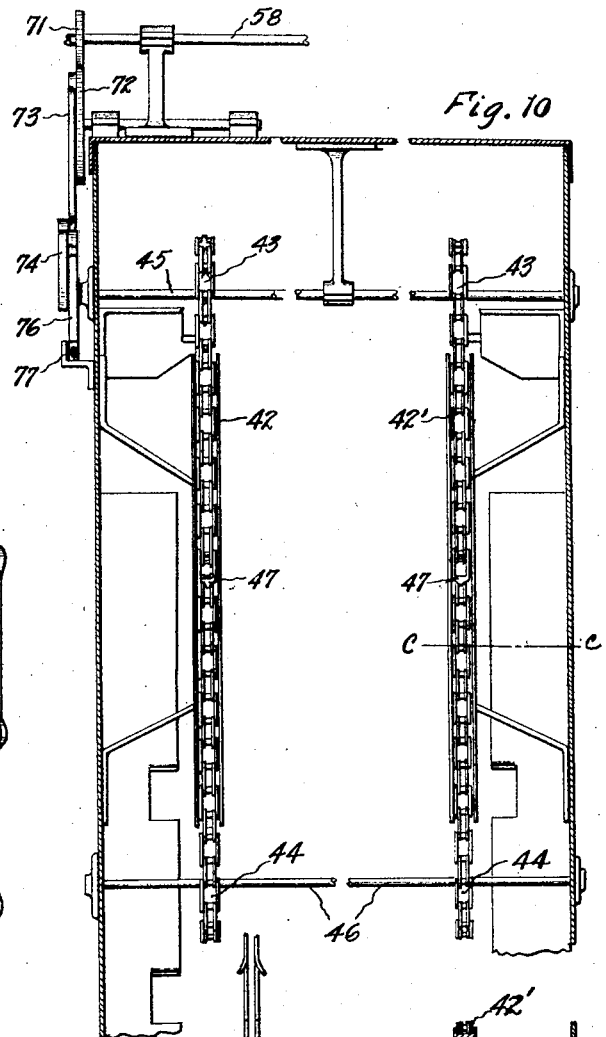

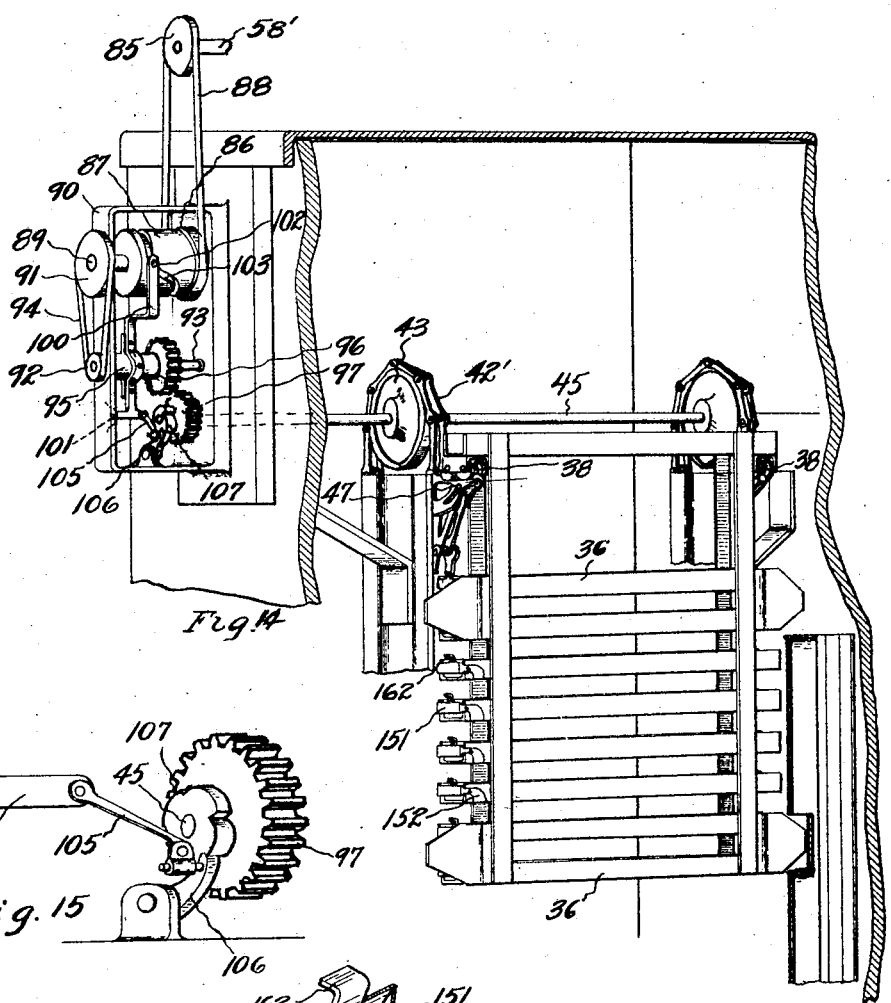

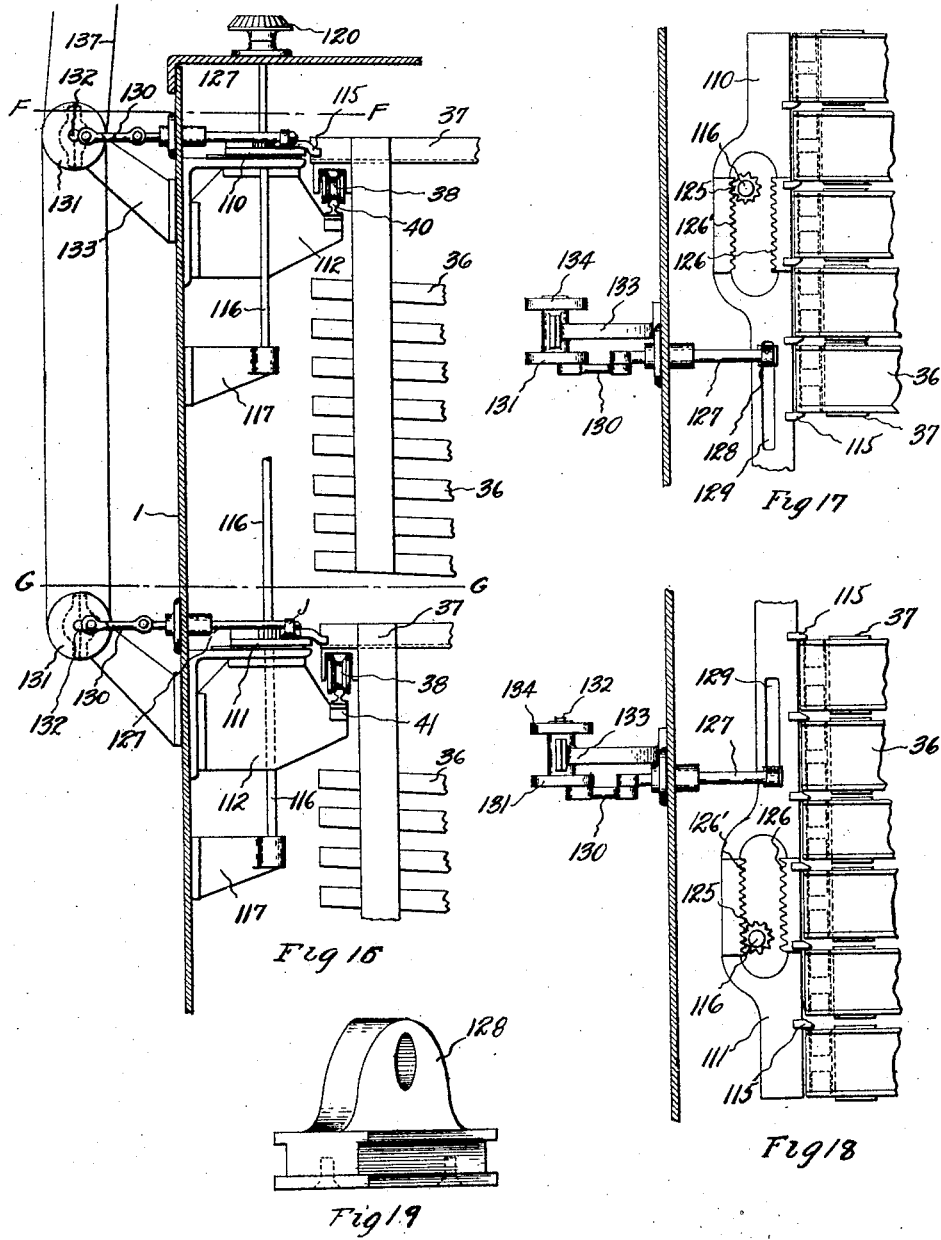

UNITED STATES PATENT OFFICE.

FRED A. J. THAYER, OF RIVERTON, AND JOHN W. ALEXANDER, OF RENTON, WASHINGTON.

RETORT.

1,412,579. Specification of Letters Patent. Patented Apr. 11, 1922.

Application filed November 24, 1919. Serial No. 340,237.

*To all whom it may concern:*

Be it known that we, FRED A. J. THAYER and JOHN W. ALEXANDER, citizens of the United States, and residents of Riverton and Renton, county of King, and State of Washington, respectively, have invented certain new and useful Improvements in Retorts, of which the following is a specification.

Our invention relates to improvements in cookers, and particularly to machines of that character used in connection with the canning of fruits, vegetables, meats, or other products that are cooked in the containers or cans in which they are sealed.

The principal object of the invention is to provide a processing machine, or cooker, which shall be an efficient cooker, which shall be of such design that it can be made conveniently, which will be efficient in its operation and which comprises mechanism that will operate automatically to intake the containers, convey them through the cooking oven and after a predetermined period of time deliver them therefrom.

It is also an object of the invention to so construct the inlet and outlet gates, or valves, through which the containers are delivered, that there will be no appreciable loss of steam from the oven during its operation.

The invention, generally stated, comprises an oven, provided interiorly with upper and lower tracks or runways, whereon a plurality of tray carriages are adapted to travel. At one side, and adjacent the forward end of the oven, is a rotating valve, or gate, which operates automatically to deliver cans or containers, of the products to be cooked, into the trays which are successively advanced to filling position.

When the several trays of a carriage have been filled, the carriage is advanced along the upper track and the trays of a following carriage are similarly filled and the carriage advanced. These filled carriages move along the upper track toward the rearward end of the oven and as they reach that end, are lowered on to the lower track and likewise are returned toward their initial point.

On reaching the forward end of the oven, the carriages are picked up by an elevating mechanism which moves intermittently, and during the intervals of rest the cans of the finished product are delivered from the trays, at one side of the oven, while cans of the product to be cooked are delivered into the carriages at the opposite side of the oven; all the movements being automatic and the process continuous.

In accomplishing the objects of the invention, we have provided improved details of construction, the preferred forms of which are illustrated in the accompanying drawings, wherein Fig. 1 is a side elevation of a machine embodying the present invention.

Fig. 1ᴬ is a side view of the same.

Fig. 2 is a transverse, vertical section, taken on the line A—A of Fig. 1, showing a tray carriage in position for receiving and discharging cans therefrom, and showing a portion of a carriage in position on the upper track.

Fig. 3 is a plan view of the casing containing the intaking valve and the valve operating mechanism.

Fig. 4 is a side elevation of the same parts, particularly illustrating the levers through which the valve is permitted to, or prevented from, advancing cans into the oven.

Fig. 5 is a detail perspective view of the control levers for retaining the valve advancing pawl from operative engagement with the valve ratchet wheel.

Fig. 6 is a perspective view of the discharge valve and its control mechanism.

Fig. 7 is a perspective view of the valve advancing pawl and lever mechanism whereby the pawl is retained from functional position.

Fig. 8 is a side view of the valve positioning device, as shown in Fig. 6.

Fig. 9 is a perspective view of the discharge chute oven from which cans are delivered from the trays into the discharge valve.

Fig. 10 is an enlarged sectional view, taken substantially on the line A—A of Fig. 1, showing the carriage elevating mechanism and guideways.

Fig. 11 is a transverse section, taken on the line C—C of Fig. 10 illustrating the manner of attaching a chain guide member to a wall of the housing.

Fig. 12 is a side view of the gearing, and ratchet mechanism for advancing the carriage conveyor, or elevating mechanism.

Fig. 13 is an enlarged, detail perspective view of a bracket link, as embodied in the elevating belts.

Fig. 14 is a fragmental, perspective view, showing the carriage lowering mechanism and the driving mechanism associated therewith.

Fig. 15 is an enlarged, perspective view, of the clutch mechanism shown in Fig. 14.

Fig. 16 is a vertical, sectional view, taken substantially on the lines D—D and E—E in Fig. 1.

Fig. 17 is a sectional view on the line F—F in Fig. 16.

Fig. 18 is a similar view on the line G—G in Fig. 16.

Fig. 19 is an enlarged perspective view, of a guide block used in connection with the mechanism shown in Figures 17 and 18.

Fig. 20 is a perspective view of a tray end gate.

Fig. 21 is a perspective view of a preferred type of carriage roller.

Fig. 22 is a plan view of a gear shifting device, used in connection with the elevating mechanism.

Referring more in detail to the drawings—

1 designates an oven wherein steam may be confined to heat and cook the canned products. This oven preferably would be made of sheet metal, in various sizes, according to the capacity desired, and is of rectangular form, It is fed by a plurality of steam pipes 2, as shown in Fig. 1.

At one side, and adjacent the forward end of the oven, is an inlet valve, or gate, whereby the cans, or containers of the product to be cooked, are successively delivered into the oven. This particular valve mechanism is contained within a housing 3, as shown in Figures 2, 3 and 4, which is secured to the side wall of the oven and which has outer and inner openings 4 and 5 respectively; the inner opening 5 being located in registration with an opening 6 in the oven wall, from which latter a trough 7 extends to such position within the oven that cans discharged therefrom will be delivered into the carriage trays.

Fixedly mounted on a central shaft 8, that is supported in the side walls of the housing 3, is a rotating valve 9, having a plurality of peripheral pockets 10, which are of such size that they will accommodate but one can or container at a time. These pockets successively pass the opening 4 as the valve revolves so that the cans, which may be delivered thereinto by any suitable conveyer machanism, are taken up and delivered singly through the openings 5 and 6 into the trough 7 and thence into the receiving trays.

The rotating valve 9 is intermittently advanced by the operation of a bell crank lever 12, rotatably mounted at one end of the shaft 8. One arm of the bell crank is pivotally connected with the lower end of a link 14 which in turn is pivotally fixed, at its upper end eccentrically to a continuously revolving wheel 15; the operation of which is later disclosed. The other arm of the bell crank carries a revoluble stub shaft 16, having a pawl 17 fixed at its inner end, and having two slightly spaced fingers 18 and 19 at its opposite end as shown clearly in Fig. 5. The pawl 17 is adapted, when released, to operatively engage and advance a ratchet wheel 20 that is fixed to the shaft 8, to cause the rotation of the valve 9 an interval equal to the spacing of the pockets 10 with each revolution on the wheel 15.

In order to give a clearer understanding of the operation of the valve 9, it will be stated here that the trays, later described more fully, when moved into position for filling will, at their receiving ends, engage the outer ends of rocker levers 21, as shown in Figures 3 and 4 and will rock the same upwardly, and by so doing will partially rotate a shaft 22 on which these levers are fixed.

The shaft 22 is supported in portions 23 depending from the trough 7, and, at one end, has a lever 21 fixed thereto, which at its upper end is slidably connected with a rod 25 that extends outwardly through the oven wall and at its outer end slidably connects with a pivotally mounted lever 26. The lever 26, which is retained against free movement by a spring 26', likewise is connected through a rod 27 with the lower end of a centrally pivoted lever 28 which at its upper end has a laterally turned foot 29 thereon. This foot normally engages the finger 19 at the end of the shaft 16, so that the pawl 17, which is also fixed to the shaft, is held from engagement with the ratchet wheel 20 and actuation of the bell-crank lever 12 causes no movement of the inlet valve, but should the lever mechanism, just described, be moved by engagement of a tray end with the levers 21, this foot 29 will be disengaged from the finger 19 which will, under certain condition presently described, permit the pawl 17 to engage the ratchet wheel, so that operation of the bell-crank will cause the valve to be advanced.

The releasing mechanism, just described, is supplemented by additional valve controlling mechanism which has for its purpose to stop rotation of the valve when no cans are being delivered thereto. Such would be the case after a supply had been delivered into the oven and before this supply had been discharged therefrom. This mechanism comprises a centrally pivoted lever 30, which at its forward end engages the finger 18, similarly as the foot 29 engages the finger 19, and at its rearward end is fixed to the lower end of a link 31, which at its opposite end, is pivotally attached to the lower end of a shorter link 32, as shown in Fig. 4.

The link 32 is fixed on the outer end of a shaft 33 which extends through the housing 3 and which has an apron 34 fixed thereon that depends within the path of cans delivered to the valve pockets. This mechanism is so arranged that a can delivered to the valve will engage the apron, to partially rotate the shaft 33 and the latter will cause the forward end of the lever 30 to move downwardly and disengage the finger 18.

It is apparent that when both fingers 18 and 19 are disengaged, the pawl 17 will be free to fall into engagement with the ratchet wheel 20 and each rotation of the wheel 15 will rock the bell crank 12 to cause the valve 9 to be advanced one interval and one can delivered into the oven.

The cans advanced through the valve 9 are delivered from the trough 7 into a series of super-imposed trays 36 which are mounted in carriages 37 suspended transversely within the oven. Each tray consists of a channel member, which is inclined slightly downwardly from its receiving end, so that the cans when released, will roll therefrom.

The carriages, of which there may be any desirable number, have laterally extending ends, as shown in Figures 2, 14 and 16 which are provided with rollers 38 adapted to follow along tracks that are fixed to the side walls of the oven and extend practically its entire length; there being two of these tracks, viz. an upper track 40 and lower track 41.

Operating adjacent the forward and rearward ends of the oven are paired elevating and lowering belts 42—42', which travel over sprocket wheels 43 and 44 fixed on shafts 45 and 46 mounted transversely within the oven. These belts are provided with paired bracket links 47, as illustrated in Figures 10, 13 and 14, which, in the case of the elevating belts at the forward end of the oven are adapted to pick up the carriages so that they may be elevated from the lower to the upper track.

The lowering belts, at the rearward end of the oven are timed, by mechanism presently described, to move downwardly just after a carriage has been advanced from the upper track on to the chain brackets, which are positioned, when the belts come to rest, in alinement with these tracks. The movement of both conveyers is accomplished in practically the same manner except where the rearward conveyer belts move without a stop, a distance sufficient to lower a carriage from the upper to the lower track, the forward belts move intermittently and only a distance at each time equal to the spacing of the trays within a carriage.

Assuming that a carriage is brought into position for filling, as shown in Fig. 2, cans are delivered, first, into the upper tray, and when this is filled the carriage moves upwardly to bring the second tray into registration with the trough 7 so that it and the following trays are likewise filled.

The mechanism for operating the carriages, and other parts of the machine as shown in Fig. 1, comprises a main drive shaft 50 which is mounted upon and extends transversely across the oven. This shaft is provided with belt wheels 51 for receiving a suitable driving belt as shown at 51', and intermediate its ends has sprocket or belt wheels 52 and 53 fixed thereon.

Toward the forward end of the oven is a shaft 54 which has a gear wheel 55 slidably keyed thereon and has belt wheels 56 and 57 fixed thereon. Closely adjacent the forward end of the oven, is a shaft 58, provided at its outer ends with bevel gear wheels 59 and 60, and intermediate its ends with a belt wheel 61 that is in alinement with belt wheel 56 on the shaft 54. A belt 62 extends operatively over these belt wheels 53 and 57 and a belt 63 extends likewise about the wheels 56 and 61, so that operation of the main drive shaft rotates the shaft 58.

Mounted at right angles to the shaft 58, along the intaking side of the oven is a shaft 65, provided at one end with a bevel gear wheel 66 which travels in mesh with the gear wheel 59. A sprocket wheel 67 is also fixed on this shaft in alinement with a sprocket wheel 69 that is fixed on the end of the shaft which carries the wheel 15 and which drives the intaking valve 9. A belt 70 operates about these latter sprocket wheels to drive the rotating valve.

At the opposite end of the shaft 58, is a gear wheel 71, which meshes, as is shown in Figures 10 and 12, with a larger gear wheel 72. Fixed eccentrically to the wheel 72 is one end of a link 73 which connects, at its lower end, with one arm of a bell-crank lever 74 that is pivoted on the outer end of the upper elevator shaft 45. The other arm of the bell-crank carries a pawl 75 which is adapted to engage and advance a ratchet wheel 76 fixed to the shaft 45 adjacent the bell-crank; the movement of the ratchet wheel effected by each operation of the bell-crank being sufficient to revolve the shaft 45 and sprocket wheels 43 to raise the carriage carried by the elevating belts the distance of the horizontal spacing of the carriage trays. Backward travel of the elevator is prevented by a fixed tooth 77 which normally engages the ratchet wheel. Each carriage is elevated in this intermittently moving manner so that all their trays may be filled by cans delivered from the trough 7. They are then delivered from the elevator and advanced along the upper track 40 to the rearward end of the oven and are delivered onto the chain brackets of the lowering belts and are lowered to the lower track 41 and likewise advanced toward the forward end of the track.

The driving connections with the lowering belts are also operated from the main drive shaft. This mechanism comprises a transverse shaft 54′, provided with a sliding gear wheel 55′ and belt wheel 56′ and 57′, and a shaft 58′ at the rear end of the oven having a belt wheel 61′ in alinement with the belt wheel 56′. A belt 62′ operates about the wheels 52 and 57′ and a belt 63′ operates over the belt wheels 56′ and 61′, so that the shaft 58′ is continuously driven. At one end of the shaft 58′ is a belt wheel 85, shown in Fig. 14, and operating thereover and over a belt surface 86 on a sleeve 87, is a chain belt 88. The sleeve 87 is fixed on a shaft 89, revolubly carried in a bracket 90 that is fixed to the side of the oven. The shaft 89 also carries a belt wheel 91, as shown best in Fig. 14, which is in alinement with a belt wheel 92 on a shaft 93 mounted in the bracket 90 below the shaft 89, and extending over these wheels is a driving belt 94.

Slidably keyed on to the shaft 93 is a sleeve 95 which has a gear wheel 96 fixed at one end thereof movable into and from mesh with a gear wheel 97 fixed on the outer end of the upper shaft 45 which controls the carriage lowering belts.

Intermittent movement of the lowering belts is effected through the intermittent engagement of the gear wheels 96 and 97, which is accomplished through a shifting lever 100. This lever is pivotally fixed at its lower end in the bracket 90, as shown at 101, and which at its upper end has a sliding pin connection, as shown at 102, with a cam groove 103 in the sleeve 87. The cam groove is of such shape that the lever is moved to throw the gears 96 and 97 into and from mesh to intermittently move and stop the conveyer.

As illustrated in Fig. 15, the lever 100 has an extending arm 104 at its lower end, with which a link 105 is pivotally connected. This link also connects with a pawl 106, which may be moved thereby from engagement with a ratchet wheel 107 that is fixed to the shaft 45. These parts are so arranged that the pawl is only positioned in functional position while the gears 96 and 97 are disengaged, and moves to functional position to prevent reverse movement of the conveyer.

The means for advancing the carriages along the tracks comprises mechanism particularly illustrated in Figures 16, 17 and 18. This mechanism comprises upper and lower bars 110 and 111, respectively, which are slidably mounted on brackets 112 fixed to the oven walls at both sides. The bars are disposed horizontally, adjacent the tracks 40 and 41.

These bars are provided with teeth 115 adapted to space and engage the carriages as they are delivered onto the tracks and each bar is reciprocated longitudinally and slightly laterally, engaging the carriages while moving in one direction, so that the latter are advanced along their respective tracks.

The means for reciprocating the bars is best illustrated in Figures 16, 17 and 18, and consists in vertical shafts 116, which are revolubly mounted within brackets 117 at opposite ends of the oven, and which extend exteriorly of the oven where they are provided with bevel gear wheels 120. These latter wheels mesh with bevel gear wheels 121 fixed on the opposite ends of transverse shafts 122, 122′, mounted at opposite ends of the oven. The shafts 122 are driven when the sliding gear wheels 55 and 55′ on shafts 54, 54′ are moved into mesh with gears 123, 123′, that are fixed on the shafts 122 and 122′.

The vertical shafts 116 are each provided with pinions 125 adapted to mesh at different times in spaced racks 126, 126′ carried by the bars 110—111, as shown in Figures 17 and 18, so that, when meshing with the inner racks they move the bars in one direction, and, when meshing with the outer racks, will move the bars in the opposite direction.

The lateral shifting of the bars is effected by means of shifting rods 127 which, at their inner ends, are fixed to blocks 128, that are slidably contained in slots 129 in the said bars, and at their outer ends, are connected with links 130 which in turn are fixed eccentrically to wheels 131 on shafts 132 rotatably carried in brackets 133 fixed to the oven walls. The shafts 133 are each provided with belt wheels 134, which aline with belt wheels 135 on shafts 136 mounted on the oven at right angles to the shafts 122—122′. Belts 137 operate over the paired belt wheels 134 and 135. The shafts 136 are each provided at their ends with bevel gear wheels 138 which mesh with bevel gear wheels 139 at the ends of the shafts 122—122′ so that, when the latter shafts are revolved, the bars are actuated longitudinally and laterally to advance the carriages along their tracks.

Shifting of the gear wheels 55—55′ at the proper times, is done by means of lugs 140, which are secured to the sides of the belts 62 and 62′, as shown in Figure 22, and which are adapted to engage the ends of shift levers 141 which will move the gear wheels 55 into contact with the gears 123—123′; the wheels being disengaged after the lug has passed the lever, by means of a spring 145 which draws the lever back to normal position. This mechanism is shown best in Figure 22.

During the travel of the carriages, the cans are retained from rolling from the trays by means of end-gates 150, which are pivotally mounted at the discharge ends of the trays, and which comprise stop portions 151 that extend across the ends of the trays and weighted balancing arms 152 which act to position the end portions. These parts are best shown in Figures 14 and 20.

At the side of the oven opposite the inlet valve, is a discharge valve 9', similar in operation and construction to the former valve. This valve 9' is contained within a housing 3'. has pockets 10' into which the cans are delivered from a trough 7' which is secured to the oven wall and extends to the discharge ends of the trays.

Referring to Figure 6 it will be seen that this trough 7' has a downwardly and outwardly turned flange 160 at its receiving end, which is provided with an opening 161. Referring to Figures 14 and 20 it will be seen that each end gate 150 is provided with an outwardly turned lip 162, which moves into the aperture 161 as the trays are elevated, causing the end gate to be swung downwardly so that the cans are released and discharged from the trays into the trough 7' and valve 9' whereby they are discharged from the machine.

The latter valve mechanism is driven by mechanism which comprises a bell-crank lever 12', wheel 15', lever 14', shaft 8' and sprocket wheel 69', all of which correspond in operation to like parts of the inlet valve, the valve being driven by means of a belt 163 which extends over the sprocket wheel 69' and a sprocket wheel 170 on a shaft 171 that is driven by a gearing connection as shown at 172.

The valve 9' is also under the control of a lever mechanism that is released by contact of the discharged cans with an apron 34', as shown in Fig. 6 which actuates the shaft 33', links 31', and 32' and lever 30' similarly as in the inlet valve to release the finger 18' and allow the pawl 17' to engage the ratchet wheel 20'.

Fig. 8 illustrates a positioning device for the valves 9 and 9', which comprises a roller 180 that is carried at one end of a crank lever 181. The lever is mounted in a block 182 that may be fixed on the casing 3 adjacent the ratchet wheel 20. A spring 183 is fixed to the lever so that the roller is urged into depressions 184 in the face of the ratchet wheel so that the valve will be yieldingly retained against displacement and will be properly positioned to receive cans within their pockets.

While we have not particularly described the timing and proportioning of the gearing and driving mechanism, it is to be understood that these parts are so proportioned and timed that the various operations will take place in proper sequence to carry out the operation of the machine as described.

Having thus described our invention, what we claim as new therein and desire to secure by Letters Patent is—

1. A cooker of the character described, comprising an oven having intake and discharge openings therein, each of said openings being closed by a rotatable valve, provided with a plurality of can receiving pockets, carriages mounted within the oven, conveyer mechanism for moving the carriages in a cycle through the oven and progressively past the intake and discharge openings, trip mechanism engageable by carriage members for releasing the discharge valve to deliver cans from its pockets into the carriages at the start of a cycle and a trip mechanism for releasing cans from the carriages into the pockets of the discharge valve and means for rotating the valves to deliver and discharge the cans.

2. A cooker of the character described, comprising an oven having intake and discharge openings, in vertical alinement, at opposite sides thereof, said openings being closed by rotatable valves, each provided with a plurality of can receiving pockets, carriages movable in a cycle through said oven and progressively past said openings, each carriage containing a plurality of trays, inclined downwardly from their receiving end and adapted to register in passing, with the said intake and discharge openings, a stop member at the lower end of each tray for normally retaining cans therein, means for actuating the intake valve to deliver cans into the trays as they successively move into registration therewith at the start of a cycle, means for depressing the stop members to deliver the cans from the trays, at the end of a cycle, into the discharge valve, and mechanism for actuating the respective valves to deliver and discharge the cans.

3. A cooker of the character described, comprising an oven having intake and discharge valves, in vertical alinement, and at opposite sides of said oven, carriages, mounted to move in a cycle within said oven, each comprising a plurality of can receiving trays inclined downwardly from their receiving ends, and having stop members normally closing their lower ends to retain cans therein, elevator mechanism operable to intermittently move the carriages to position the ends of the several trays, on successive movements, in registration with the discharge and intake valves, a trip member engagable with the stop members to release the cans into the discharge valve, a trip member engagable by the tray on a following upward movement to release the intake valve and mechanism for actuating the valves to deliver cans into and from the oven.

4. A cooker of the character described, comprising an oven having intake and discharge valves therein, upper and lower tracks mounted within said oven, carriages movable upon said tracks, mechanism for lowering the carriages from the upper to the lower track at one end of said oven, elevator mechanism at the opposite end of the oven for transferring the carriages successively from the lower on to the upper track, mechanism for progressively advancing the carriages along said tracks, means for actuating the valves to deliver cans into the carriages at the start of a cycle and to discharge cans therefrom on completion of a cycle.

5. In a cooker of the character described, having intake and discharge valves, in vertical alinement, at opposite sides thereof, carriages mounted within the oven, each comprising a plurality of super-imposed, parallel trays, inclined downwardly from their receiving ends, and adapted to pass in registration, at opposite ends, with the intake and discharge valves, an elevator mechanism, intermittently movable to advance the trays, and means for actuating the valves to deliver cans into the trays at their upper ends and from the trays at their lower ends.

6. In a cooker of the character described, having intake and discharge valves, in vertical alinement, at opposite sides thereof, carriages mounted within the oven, each comprising a plurality of super-imposed, parallel trays, inclined downwardly from their receiving ends, and adapted to pass in registration, at opposite ends, with the intake and discharge valves, pivotally mounted stops at the lower ends of said trays for normally retaining cans therein, an elevator mechanism for intermittently moving the carriages upwardly to move the trays successively into registration at their opposite ends with the discharge and intake valves, means secured to the oven to depress the stop members of the individual trays to release the cans therefrom into the discharge valve and means engageable by the tray on its following upward movement to release the discharge valve and mechanism for actuating the valves to deliver cans into and from the trays.

7. In a cooker of the character described, an oven having an intake opening, a rotatable valve, provided with a plurality of can receiving pockets, mounted within and closing said opening, a shaft for said valve, a ratchet wheel fixed on said shaft, a bell-crank lever pivotally mounted on the shaft adjacent the ratchet wheel, a pawl on one arm of the lever engageable with the ratchet wheel, a revolubly driven shaft, a link connected, at one end, to the other arm of the bell-crank and at its opposite end eccentrically to said driven shaft, whereby rotation of the latter will actuate the bell-crank to advance the valve, trays movable within the oven, a trip mechanism, for normally retaining the pawl disengaged from the ratchet wheel, and movable by engagement of a tray therewith to release the pawl to actuate the valve to deliver cans into the tray.

8. In a cooker of the character described, an oven having an intake opening, a valve housing provided at one side with a discharge opening in registration with the oven opening, and at its opposite side with a receiving opening, a rotatable valve mounted within said housing and having can receiving pockets adapted to pass said openings, a shaft for said valve, a ratchet wheel fixed on said shaft, a bell-crank lever pivotally mounted on the shaft adjacent the ratchet wheel, a continuously revoluble shaft, a link eccentrically connected, at one end, to said revolving shaft and at its opposite end to one arm of the bell-crank, a pawl pivotally mounted on the other arm of the shaft, engageable with the ratchet wheel, to advance the valve, trays movable within the oven to receive cans from the valves, a trip member depending within the receiving opening of the valve housing engageable by cans delivered to the valve pockets, and a trip mechanism within the path of trays advanced to receiving position; said trip members being adapted to normally retain the pawl disengaged from the ratchet but when actuated simultaneously will release the pawl to actuate the valve to deliver cans into the trays.

9. In a cooker of the character described an oven having intake and discharge valves, tracks within said oven, can carriages movable along said tracks past said valves, carriages advancing bars mounted adjacent and parallel to each track, abutment members on said bars engageable with said carriages, means for reciprocating the bars longitudinally, to advance the carriages along the tracks, and means for moving the bars laterally to disengage the carriages when moving in a rearward direction.

Signed at Seattle, Washington.

FRED A. J. THAYER.
JOHN W. ALEXANDER.